(12) United States Patent
Thiriot et al.

(10) Patent No.: US 12,483,332 B2
(45) Date of Patent: Nov. 25, 2025

(54) DEVICE FOR LIGHT TRANSMISSION OF AN ANALOGUE SIGNAL

(71) Applicant: Jean-Claude Marian, Brussels (BE)

(72) Inventors: Cyril Thiriot, La-Guierche (FR); Lilian Brun, Saint-Aubin-des-Chateaux (FR)

(73) Assignee: LIFI, Saint-Herblain (FR)

( * ) Notice: Subject to any disclaimer, the term of this patent is extended or adjusted under 35 U.S.C. 154(b) by 187 days.

(21) Appl. No.: 18/034,164

(22) PCT Filed: Oct. 19, 2021

(86) PCT No.: PCT/FR2021/051824
§ 371 (c)(1),
(2) Date: Apr. 27, 2023

(87) PCT Pub. No.: WO2022/090647
PCT Pub. Date: May 5, 2022

(65) Prior Publication Data
US 2023/0421265 A1    Dec. 28, 2023

(30) Foreign Application Priority Data

Oct. 28, 2020   (FR) ..................... 20/11048

(51) Int. Cl.
*H04B 10/00*     (2013.01)
*H04B 10/114*    (2013.01)
(Continued)

(52) U.S. Cl.
CPC ....... *H04B 10/502* (2013.01); *H04B 10/1141* (2013.01); *H04B 10/69* (2013.01)

(58) Field of Classification Search
CPC . H04B 10/112; H04B 10/1123; H04B 10/114; H04B 10/1141; H04B 10/1143;
(Continued)

(56) References Cited

U.S. PATENT DOCUMENTS

| 3,488,586 A | * | 1/1970 | Harnden, Jr. | ........ | H04B 10/502 |
| | | | | | 250/214 R |
| 3,900,404 A | | 8/1975 | Dachs | | |

(Continued)

FOREIGN PATENT DOCUMENTS

| EP | 3462510 A1 | 4/2019 |
| WO | 2017195062 A1 | 11/2017 |

OTHER PUBLICATIONS

Honglei Li, "An Analog Modulator for 460Mb/S Visible Light Data Transmission Based on OOK-NRZ Modulation", Visible Light Communications, IEE Wireless Communications, vol. 22, No. 2 Apr. 1, 2015, pp. 68-73, XP011579862.
(Continued)

*Primary Examiner* — Hanh Phan
(74) *Attorney, Agent, or Firm* — CANTOR COLBURN LLP

(57) ABSTRACT

Assembly for transmitting an analog signal including a light transmission device for transmitting an analog signal in a first frequency band lower than 20 kHz, the light transmission device having a transmission unit along with an excitation unit configured to excite the transmission unit, where the frequency or the duration of excitation is determined according to a value of the analog signal, the excitation frequency being in a second frequency band greater than 1 MHz, the transmission assembly also including a light receiving device configured to generate an output analog signal.

9 Claims, 2 Drawing Sheets

(51) Int. Cl.
*H04B 10/50* (2013.01)
*H04B 10/69* (2013.01)

(58) Field of Classification Search
CPC .. H04B 10/1149; H04B 10/116; H04B 10/40; H04B 10/502; H04B 10/69; H04B 10/691; H04B 10/541
USPC ....... 398/118, 119, 127, 128, 129, 130, 131, 398/172, 135, 136, 182, 183, 186, 187, 398/189, 190, 192, 193, 194, 159, 202, 398/208, 209
See application file for complete search history.

(56) References Cited

U.S. PATENT DOCUMENTS

| | | | | |
|---|---|---|---|---|
| 8,942,572 B2 * | 1/2015 | Rothenberg | ......... | H04B 10/116 |
| | | | | 398/118 |
| 10,341,017 B1 * | 7/2019 | McElveen | ............ | H04B 10/116 |
| 2009/0245806 A1 * | 10/2009 | Murayama | ........... | H04B 10/116 |
| | | | | 398/172 |
| 2013/0336662 A1 * | 12/2013 | Murayama | ........... | H04B 10/116 |
| | | | | 398/130 |
| 2016/0218807 A1 | 7/2016 | Tran | | |

OTHER PUBLICATIONS

International Search Report for corresponding application PCT/FR2021/051824 filed Oct. 19, 2021; Mail date Feb. 9, 2022.

* cited by examiner

[Fig. 1]
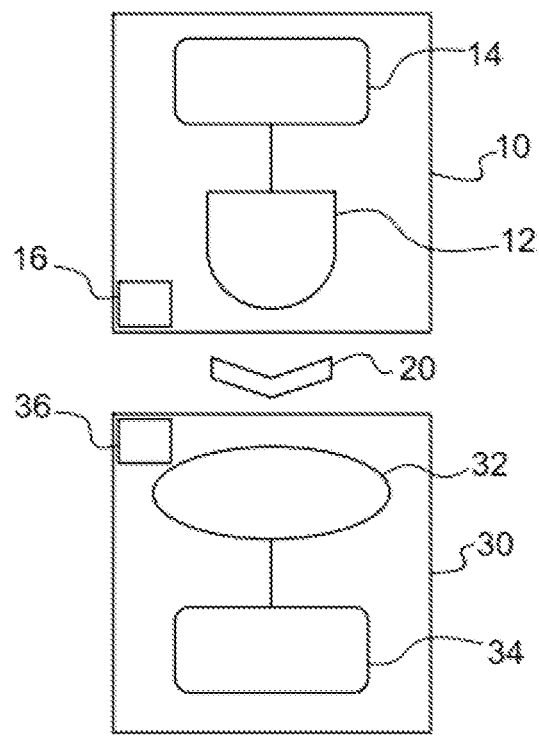
[Fig. 2]
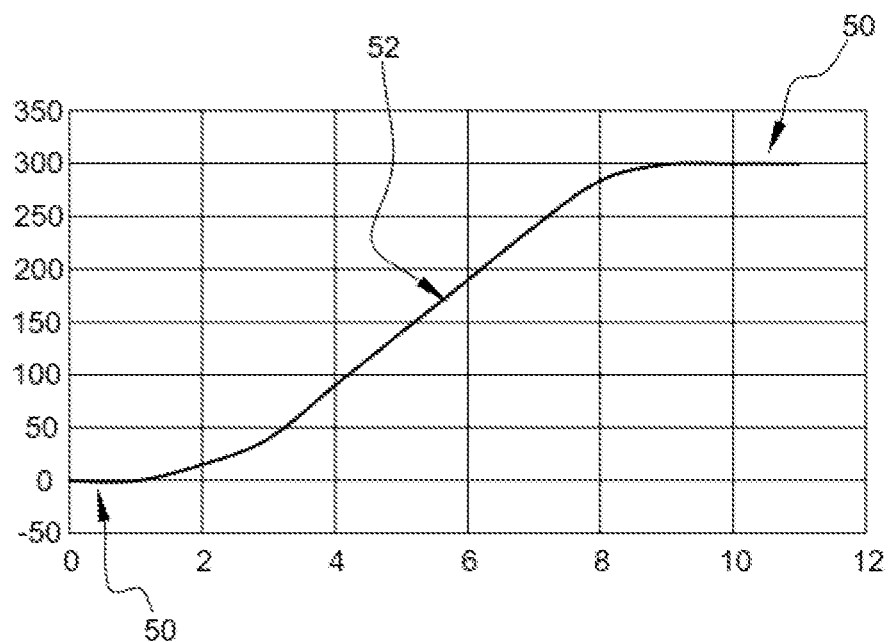

[Fig. 3]
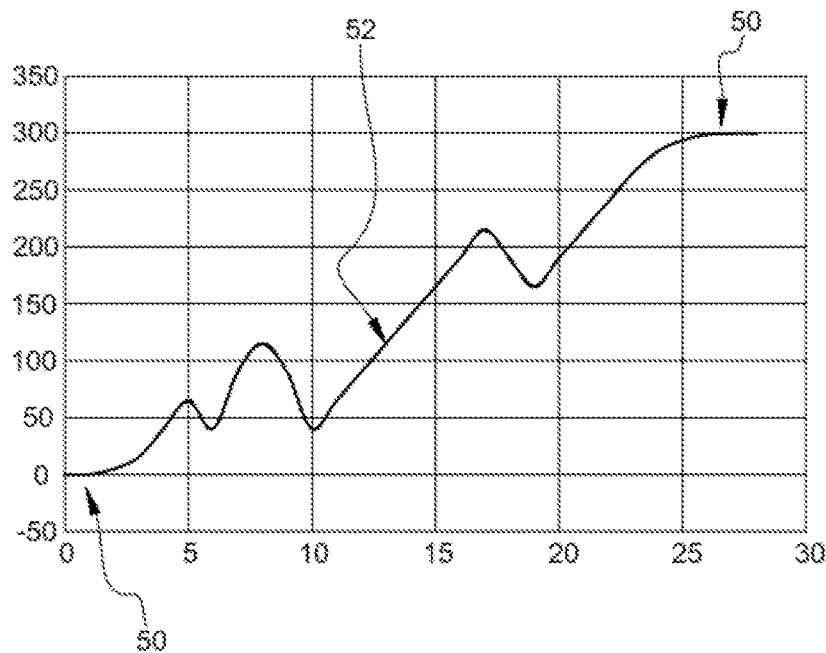
[Fig. 4]
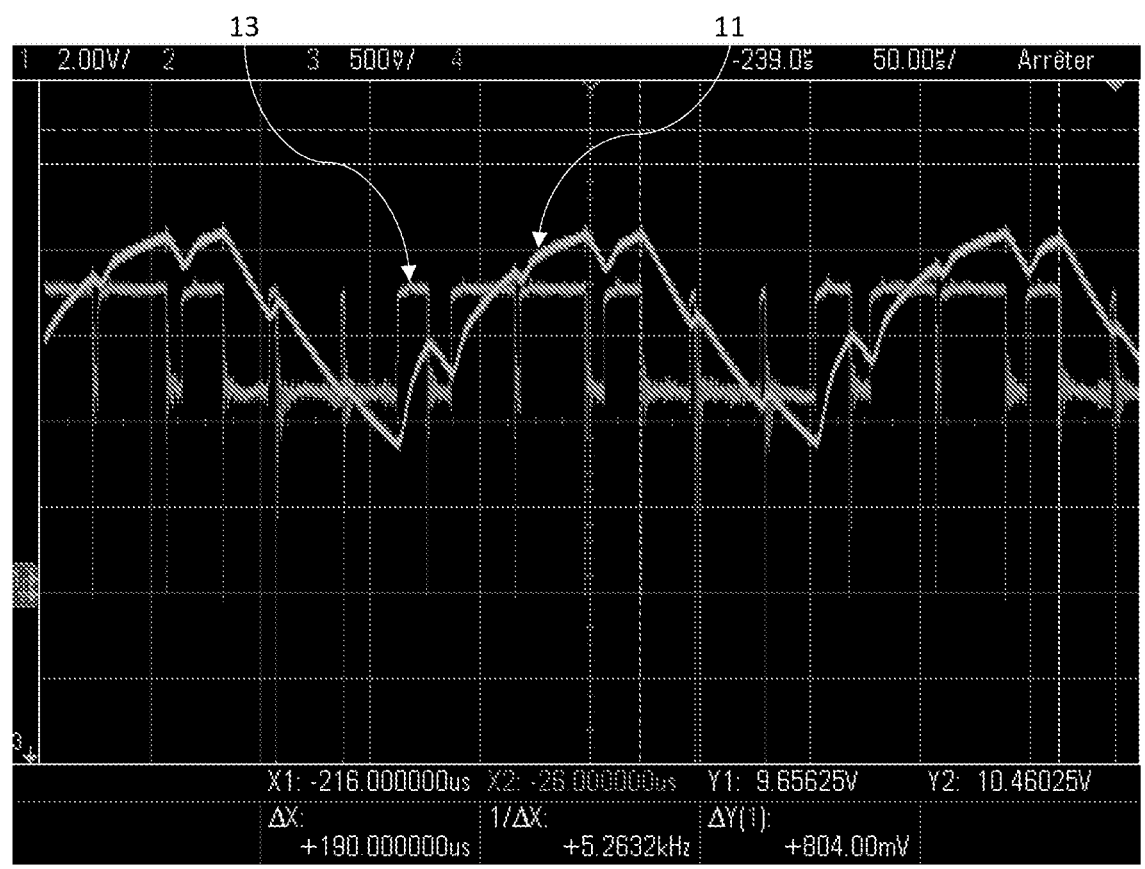

DEVICE FOR LIGHT TRANSMISSION OF AN ANALOGUE SIGNAL

TECHNICAL FIELD

The disclosure generally concerns communication systems and, more specifically, a light transmission device for transmitting an analog signal.

BACKGROUND

In known manner, the document US20160218807 describes a communication system comprising a light source for generating light; a wideband light emitter control electronics for modulating a light signal and providing a wideband optical data transmission network using the light source; a wideband light receiver control electronics for demodulating a light signal received from the wideband optical data transmission network; and a wired network transceiver coupled to the light transmitter/receiver for receiving and transmitting data between the optical data transmission network and a wired circuit.

However, these solutions do not provide complete satisfaction.

Indeed, the communication system of document US20160218807, by its operation involves an emitter control electronics having a high computing capacity as well as a similar reception control electronics. Such control electronics induce high energy consumption.

The present invention aims to solve all or part of the drawbacks mentioned hereinabove.

The present invention also aims to offer an alternative to the communication system described in the document US20160218807.

BRIEF SUMMARY

To this end, the present invention relates to a light transmission device for transmitting an analog signal in a first frequency band lower than 20 kHz comprising:
  a transmission unit configured to transmit a light signal in the visible spectrum;
  an excitation unit configured to generate an excitation, the excitation being configured to excite the transmission unit; and
  wherein the frequency or the duration of the excitation is determined as a function of a value of the analog signal, the excitation frequency being included in a second frequency band greater than 1 MHz.

Such an arrangement, and more specifically an excitation frequency included in a second frequency band greater than 1 MHz, makes it possible to ensure a lighting that is acceptable to the human eye. Within the context of the present invention, the term "acceptable to the human eye" means having a frequency high enough so that the human eye does not discern blinking.

According to an embodiment, the excitation frequency is equal to 2 MHz. Such an excitation frequency makes it possible to obtain an analog signal of better quality without however requiring a high-performance excitation unit and therefore consuming more energy. Indeed, the higher the excitation frequency, the more the light signal emitted varies accurately.

Such an arrangement allows the transmission of a light signal having a variable intensity and thus allows the transmission of an analog light signal.

Within the context of the present invention, the visible spectrum comprises the electromagnetic waves that have a wavelength comprised between 380 nm and 780 nm.

According to an embodiment, such an arrangement makes it possible to use an already existing transmission unit in a lighting network for example. Such an arrangement is therefore ecologically economical.

Such an arrangement makes it possible to obtain the transmission of an analog signal by light without requiring a guide such as an optical fiber for example.

According to an embodiment, the transmission unit comprises a phosphorescent light-emitting diode. According to a preferred embodiment, the phosphorescent light-emitting diode is a white phosphorescent light-emitting diode.

Such an arrangement makes it possible to obtain a transmission unit capable of emitting light between two excitations for a longer time compared to an incandescent bulb for example.

According to an embodiment, the excitation unit is configured to excite the transmission unit when said transmission unit is in a decreasing transient state or in a steady state in which the light intensity is null.

Within the context of the present invention, a decreasing transient state is a transient state in which the intensity of the light emitted by the emission unit is decreasing. Such a transient state is obtained between two excitations.

According to an embodiment, the light transmission device comprises a first communication unit configured to communicate with a remote second communication unit according to an electromagnetic communication protocol.

Within the context of the present invention, an electromagnetic signal is a radio signal.

Such an arrangement allows the transmission device to transmit data using an analog light signal and also to receive data using an electromagnetic signal.

According to an embodiment, the first communication unit is configured to communicate according to any of the electromagnetic communication protocols such as "RFID", "Bluetooth" or even "BLE" for example.

The invention also relates to a light receiving device configured to generate an output analog signal comprising:
  a receiving unit having a latency time lower than 1 is configured to receive the light signal emitted by a light transmission device;
  an intensity measurement unit configured to measure an intensity of the light signal received by the receiving unit and to generate an output analog signal in a first frequency band lower than 20 kHz.

Such an arrangement makes it possible to obtain an analog signal transmitted by light.

A receiving unit having a latency time lower than 1 µs is able to receive a light signal emitted by a transmission unit excited by an excitation unit at a frequency greater than 1 MHz.

According to an embodiment, the receiving unit comprises a photovoltaic cell.

Such an arrangement, and more specifically the phosphorescent character of the diode associated with the latency of the photovoltaic cell, allows smoothing of the output generated analog signal, and this without requiring demodulation.

According to an embodiment, such an arrangement makes it possible to obtain a receiving unit that is energetically passive, or even generating energy.

According to an embodiment, the photovoltaic cell is an organic photovoltaic cell called OPV.

According to an embodiment, such an arrangement makes it possible to obtain a high reception gain and thus to obtain good quality of reception even when the intensity of the received light signal is very much lower than the intensity of the ambient light. As an example, the device according to the invention is capable of receiving a signal of 40 Lux in an ambient light of more than 10,000 Lux.

According to an embodiment, the receiving device comprises a second communication unit configured to communicate with a first remote communication unit according to an electromagnetic communication protocol.

Such an arrangement allows the receiving device to receive data using an analog light signal and also to transmit data using an electromagnetic signal.

According to an embodiment, the second communication unit is configured to communicate according to any of the electromagnetic communication protocols such as "RFID", "Bluetooth" or even "BLE" for example.

The invention also concerns an assembly for transmitting an analog signal comprising:
- a light transmission device for transmitting an analog signal in a first frequency band lower than 20 kHz comprising:
 - a transmission unit configured to transmit a light signal in the visible spectrum,
 - an excitation unit configured to excite the transmission unit:
 - wherein the frequency or the duration of excitation is determined as a function of a value of the analog signal, the emitted excitation frequency being within a second frequency band greater than 1 MHz;
- a light receiving device configured to generate an output analog signal comprising:
 - a receiving unit having a latency time lower than 1 µs configured to receive the light signal emitted by the light transmission device;
 - an intensity measurement unit configured to measure an intensity of the light signal received by the receiving unit and to generate an output analog signal in the first frequency band.

The invention also relates to a method for transmitting an analog signal in a first frequency band lower than 20 kHz comprising the following steps:
- exciting a transmission unit configured to transmit a light signal in the visible spectrum, in which the frequency or the duration of excitation is determined as a function of a value of the analog signal, the excitation frequency being within a second frequency band greater than 1 MHz;
- emitting a light signal by the excited transmission unit;
- receiving a light signal by a receiving unit;
- measuring the intensity of the light signal received by the receiving unit using an intensity measurement unit and for generating an output analog signal in the first frequency band, in which the receiving unit has a latency time lower than 1 µs.

The various non-incompatible aspects defined hereinabove may be combined.

BRIEF DESCRIPTION OF FIGURES

The invention will be even better understood with the aid of the detailed description which is set out below with regard to the appended drawings in which:

FIG. 1 represents a schematic view of an assembly for transmitting an analog signal comprising a light transmission device and a light receiving device in accordance with the present invention;

FIG. 2 represents a first example of a steady state as well as a transient state in accordance with the present invention;

FIG. 3 represents a second example of a steady state as well as a transient state in accordance with the present invention; and FIG. 4 represents the intensity of an analog light signal as a function of time, the analog signal being transmitted by a light transmission device in accordance with the present invention.

DETAILED DESCRIPTION

FIG. 1 represents an assembly for transmitting an analog signal 11 comprising a light transmission device 10 and a light receiving device 30.

The light transmission device 10 is configured to transmit an analog signal 11 in a first frequency band lower than 20 kHz and comprises a transmission unit 12 configured to transmit a light signal 20 in the visible spectrum. Within the context of the present invention, the visible spectrum comprises electromagnetic waves having a wavelength comprised between 380 nm and 780 nm. According to an embodiment, such an arrangement makes it possible to use an already existing transmission unit 12 in a lighting network, for example. Such an arrangement is therefore ecologically economical.

The transmission unit 12 comprises a phosphorescent light-emitting diode, which makes it possible to obtain a transmission unit 12 capable of emitting light between two excitations 13 for a longer time compared to an incandescent bulb for example.

The light transmission device 10 also comprises an excitation unit 14 configured to excite the transmission unit 12. Such an arrangement allows the transmission of a light signal having a variable intensity and thus allows the transmission of an analog light signal as represented in FIG. 4. Within the context of the present invention, an excitation 13 is an electrical signal sent to the transmission unit 12. The frequency of the excitation corresponds to the number of excitations 13 sent during a given time.

The frequency or the duration of excitation is determined as a function of a value of the analog signal 11, the excitation frequency being included in a second frequency band greater than 1 MHz. Such an arrangement, and more specifically an excitation frequency included in a second frequency band greater than 1 MHz, makes it possible to ensure a lighting that is acceptable to the human eye. Within the context of the present invention, the term "acceptable to the human eye" means having a frequency high enough so that the human eye does not discern blinking.

According to an embodiment, the excitation frequency is constant and preferably equal to 2 MHz. Such an excitation frequency makes it possible to obtain an analog signal of better quality without however requiring a high-performance excitation unit 14 and therefore consuming more energy. Indeed, the higher the excitation frequency, the more the light signal emitted varies accurately. The generation of the analog light signal 11 is then possible by modifying the duration of each excitation 13 as represented in FIG. 4. By adjusting the duty cycle, it is therefore possible to obtain an accurate analog signal 11. Such an arrangement also makes it possible to avoid any stroboscopic or blinking effect that the transmission unit 12 could create. Indeed, with a constant excitation frequency, the impedance of the transmission unit 12, which is a light-emitting diode, remains constant. The changes in light intensity corresponding to the analog signal 11 are therefore invisible to the naked eye. In other words, the excitation unit 14 performs a pulse width modulation, the pulse corresponding to the excitation 13.

According to an embodiment, the excitation unit 14 is configured to excite the transmission unit 10 when said transmission unit 12 is in a transient state 52, in contradistinction to a steady state 50, as represented in FIGS. 2 and 3. According to a preferred embodiment, the excitation unit 14 is configured to excite the transmission unit 10 when said transmission unit 12 is in a decreasing transient state 52 or in a steady state in which the light intensity is null. Within the context of the present invention, a decreasing transient state 52 is a transient state in which the intensity of the light emitted by the emission unit 12 is decreasing. Such a transient state is obtained between two excitations 13.

The light receiving device 30 is configured to generate an output analog signal 11 and comprises a receiving unit 32 having a latency time lower than 1 µs. The receiving unit 32 is configured to receive the light signal 20 emitted by the light transmission device 10. A receiving unit 32 having a latency time lower than 1 µs makes it possible to receive a light signal emitted by a transmission unit 12 excited by an excitation unit 14 at a frequency greater than 1 MHz.

The receiving unit 32 comprises an organic photovoltaic cell. Such an arrangement, and more specifically the phosphorescent character of the diode associated with the latency of the photovoltaic cell, allows smoothing of the output generated analog signal 11, and this without requiring demodulation. Such an arrangement makes it possible to obtain a receiving unit 32 that is energetically passive, or even generating energy. According to one embodiment, an organic cell makes it possible to obtain a high reception gain and thus to obtain a good quality of reception even when the intensity of the received light signal is much lower than the intensity of the ambient light. As an example, the device according to the invention is capable of receiving a signal of 40 Lux in an ambient light of more than 10,000 Lux.

The light receiving device 30 also comprises an intensity measurement unit 34 configured to measure the intensity of the light signal 20 received by the receiving unit 32 and to generate an output analog signal 11 in the first frequency band lower than 20 kHz.

According to an embodiment, the light transmission device 10 comprises a first communication unit 16 configured to communicate with a second communication unit 36. The second communication unit 36 is comprised in the light receiving device 30. The first communication unit 16 and the second communication unit 36 communicate with each other according to an electromagnetic communication protocol, namely a radio protocol such as "RFID", "Bluetooth" or even "BLE" for example. Such an arrangement allows the transmission device 10 to transmit data using an analog light signal and also to receive data using an electromagnetic signal. Reciprocally, such an arrangement allows the receiving device 30 to receive data using an analog light signal and also to transmit data using an electromagnetic signal.

The invention also concerns a method for transmitting an analog signal 11 in a first frequency band lower than 20 kHz comprising the following steps:

exciting a transmission unit 12 configured to transmit a light signal 20 in the visible spectrum, in which the frequency or the duration of excitation is determined as a function of a value of the analog signal 11, the excitation frequency being included in a second frequency band greater than 1 MHz;

emitting a light signal 20 by the excited transmission unit 12;

receiving a light signal 20 by a receiving unit 32;

measuring the intensity of the light signal 20 received by the receiving unit 32 using an intensity measurement unit 34 and to generate an output analog signal 11 in the first frequency band, in which the receiving unit 32 has a latency time of less than 1 µs.

According to an embodiment, the transmission method is executed using the light transmission device 10 previously described. Thus, the various features and embodiments described with reference to the light transmission device 10 also apply to the transmission method.

Of course, the invention is not limited to the embodiments represented and described hereinabove, but on the contrary extends to all variants.

The invention claimed is:

1. A light transmission device comprising:
   a transmission unit configured to transmit a light signal in a visible spectrum; and
   an excitation unit configured to generate an excitation signal, the excitation signal being configured to excite the transmission unit only when the transmission unit is in a decreasing transient state or in a steady state in which a light intensity of the light signal is zero;
   wherein the excitation signal has a frequency or duration varying as a function of an analog signal to be transmitted by the transmission unit, the analog signal having a frequency comprised in a first frequency band lower than 20 kHz and the excitation signal having a frequency comprised in a second frequency band greater than 1 MHz.

2. The light transmission device according to claim 1, wherein the transmission unit comprises a phosphorescent light-emitting diode.

3. The light transmission device according to claim 1, wherein the light transmission device comprises a first communication unit configured to communicate with a second remote communication unit according to an electromagnetic communication protocol.

4. A light receiving device comprising:
   a receiving unit configured to receive a light signal emitted by a light transmission unit, the receiving unit having a latency time of less than 1 µs; and
   an intensity measurement unit configured to measure an intensity of the light signal received by the receiving unit and to generate an output analog signal based on the intensity of the received light signal, the analog signal having a frequency comprised in a first frequency band lower than 20 kHz,
   wherein the light signal is generated by exciting the transmission unit by an excitation signal, the excitation signal being configured to excite the transmission unit only when the transmission unit is in a decreasing transient state or in a steady state in which the light intensity is zero, the excitation signal having a frequency comprised in a second frequency band greater than 1 MHZ.

5. The light receiving device according to claim 4, wherein the receiving unit comprises a photovoltaic cell.

6. The light receiving device according to claim 5, wherein the photovoltaic cell is an organic photovoltaic cell.

7. The light receiving device according to claim 4, further comprising a second communication unit configured to communicate with a first remote communication unit according to an electromagnetic communication protocol.

8. An assembly for transmitting an analog signal, the assembly comprising:
   a light transmission device for transmitting an analog signal in a first frequency band lower than 20 kHz, the light transmission device comprising:
      a transmission unit configured to transmit a light signal in a visible spectrum,
      an excitation unit configured to excite the transmission unit according to an excitation signal, the excitation signal being configured to excite the transmission unit only when the transmission unit is in a decreasing transient state or in a steady state in which the light intensity is zero,
      wherein the excitation signal has a frequency or duration varying as a function of the analog signal, the excitation signal having a frequency comprised in a second frequency band greater than 1 MHz, and
   a light receiving device configured to generate an output analog signal comprising:
      a receiving unit having a latency time lower than 1 μs and configured to receive the light signal emitted by the light transmission device;
      an intensity measurement unit configured to measure an intensity of the light signal received by the receiving unit and to generate an output analog signal in the first frequency band, based on the intensity of the received light signal.

9. A method for transmitting an analog signal, the method comprising the following steps:
   only when the transmission unit is in a decreasing transient state or in a steady state in which the light intensity is null, exciting a transmission unit according to an excitation signal having a frequency or a duration varying as a function of the analog signal, the analog signal being comprised in a first frequency band lower than 20 kHz and the excitation frequency being comprised in a second frequency band greater than 1 MHz;
   emitting a light signal in a visible spectrum by the transmission unit excited by the excitation signal;
   receiving a light signal by a receiving unit having a latency time lower than 1 μs;
   measuring an intensity of the light signal received by the receiving unit using an intensity measurement unit; and
   generating an output analog signal in the first frequency band, based on the intensity of the received light signal.

* * * * *